United States Patent
Smirnov et al.

(10) Patent No.: US 7,427,984 B2
(45) Date of Patent: *Sep. 23, 2008

(54) POINT ERASING

(75) Inventors: Vladimir Smirnov, Bothell, WA (US); Shiraz Somji, Kenmore, WA (US); Sam J. George, Duvall, WA (US); Koji Kato, Sammamish, WA (US); Quan B. To, Redmond, WA (US); Rudolph Balaz, Redmond, WA (US); Benjamin M. Westbrook, Redmond, WA (US); Andrew Silverman, Philadelphia, PA (US)

(73) Assignee: Microsoft Corporation, Redmond, WA (US)

( * ) Notice: Subject to any disclaimer, the term of this patent is extended or adjusted under 35 U.S.C. 154(b) by 659 days.

This patent is subject to a terminal disclaimer.

(21) Appl. No.: 10/902,431

(22) Filed: Jul. 30, 2004

(65) Prior Publication Data

US 2005/0088426 A1    Apr. 28, 2005

Related U.S. Application Data

(60) Provisional application No. 60/514,800, filed on Oct. 26, 2003.

(51) Int. Cl.
*G06F 3/033* (2006.01)
(52) U.S. Cl. .................. 345/179; 345/156; 345/173; 178/18.01; 178/19.01
(58) Field of Classification Search .............. 345/156, 345/173, 179; 178/18.01, 19.01, 19.04
See application file for complete search history.

(56) References Cited

U.S. PATENT DOCUMENTS

| 4,633,436 | A | * | 12/1986 | Flurry | 345/179 |
|---|---|---|---|---|---|
| 5,347,620 | A | * | 9/1994 | Zimmer | 345/592 |
| 5,534,893 | A | | 7/1996 | Hansen, Jr. et al. | |
| 6,111,565 | A | * | 8/2000 | Chery et al. | 345/179 |
| 6,326,957 | B1 | | 12/2001 | Nathan et al. | |
| 6,707,473 | B2 | * | 3/2004 | Dresevic et al. | 715/768 |
| 6,724,372 | B1 | | 4/2004 | Bi et al. | |
| 6,909,430 | B2 | * | 6/2005 | Dresevic et al. | 345/611 |
| 7,190,375 | B2 | * | 3/2007 | Dresevic et al. | 345/611 |
| 2005/0052433 | A1 | * | 3/2005 | Silverman et al. | 345/179 |
| 2005/0093836 | A1 | * | 5/2005 | Dodge et al. | 345/179 |
| 2007/0176904 | A1 | * | 8/2007 | Russo | 345/173 |

OTHER PUBLICATIONS

Michael P. Salisbury et al., "Interactive Pen-and-Ink Illustration", Department of Computer Science and Engineering.
Eric Saund et al., "Stylus Input and Editing Without Prior Selection of Mode", vol. 5, Issue 2, ACM 2003.
Eric Saund et al., "Perceptually-Supported Image Editing of Text and Graphics", vol. 5, Issue 2, ACM 2003.
Gene Golovchinsky et al., "Moving Markup: Repositioning Freeform Annotations", vol. 4, Issue 2.
Jonathan M. Cohen et al., "Harold: A Word Made of Drawings", pp. 83-90, ACM 2000.

* cited by examiner

*Primary Examiner*—My-Chau T Tran
(74) *Attorney, Agent, or Firm*—Lee & Hayes, PLLC

(57) ABSTRACT

A system and method for erasing ink is described. Using an erasing contour, the system determines closest points which come close to or contacts the erasing contour when it encounters an ink stroke. Portions of an ink stroke may then be erased when the erasing contour contacts the ink stroke.

20 Claims, 10 Drawing Sheets

POINT ERASING

RELATED APPLICATION INFORMATION

This application is related to U.S. Ser. No. 60/514,800, filed Oct. 26, 2003, entitled "Ink Editing Architecture", to Silverman, George, Somji, Kato, Krantz, Mogilevsky, Harper, To, and Smirnov, of which application is incorporated herein by reference as to its entirety.

BACKGROUND OF THE INVENTION

1. Field of the Invention

The present invention relates to computer processing systems. More particularly, aspects of the present invention relate to erasing displayed information.

2. Description of Related Art

Computer systems are beginning to handle electronic ink in increasingly lifelike ways. Electronic ink is now able to flow relatively smoothly from a stylus onto a display.

Just as users desire to write in a lifelike way onto screen using digital ink, users also desire to erase in a lifelike way. Previous approaches to erasing ink included deleting ink strokes as a whole. Other approaches included deleting portions of ink strokes when contacted by an eraser. In this latter approach, the erasing did not begin to occur until a user was passed the midline of the ink stroke. This often caused confusion whether the computing system was keeping up with the users input. Additionally, it had the effect of making users wonder whether the computing system was as exacting as desired.

An improved approach to erasing ink strokes that more closely mirrors the process and display of erasing actual ink is needed.

BRIEF SUMMARY

Aspects of the present invention address one or more problems described above, thereby providing a more lifelike experience to users. Aspects of the present invention allow a user to begin to erase ink strokes closer to a point where an erasing contour enters the stroke's boundaries. These and other aspects are described in greater detail below.

BRIEF DESCRIPTION OF THE DRAWINGS

The present invention is illustrated by way of example and not limited in the accompanying Figures in which like reference numerals indicate similar elements and in which.

DETAILED DESCRIPTION

Figure 1:
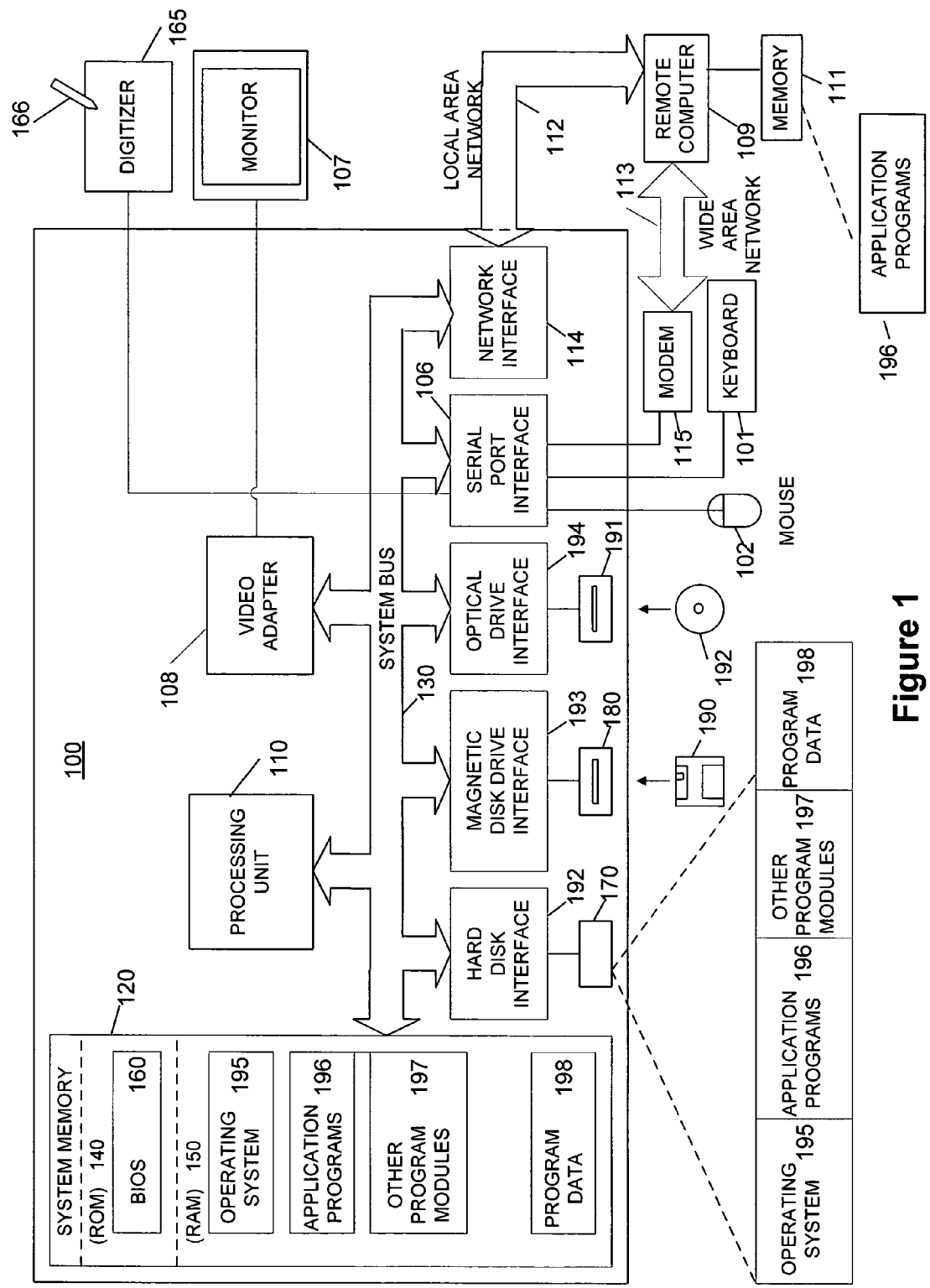
FIG. 1 describes a general-purpose computing environment in accordance with aspects of the present invention.

Aspects of the present invention relate to handing stylus events in an efficient manner to quickly render electronic ink to a user.

This document is divided into sections to assist the reader. These sections include: characteristics of ink, terms, general-purpose computing environment, contact erasing, the erasing input, process for erasing, ink tip shape: circle, cutting with a linear segment, cutting with an arc, cutting with a point, and ink tip shape: segment with polite in a tip.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, $\Theta$), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Terms

Ink A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level Ink object A data structure storing ink with or without properties.

Stroke A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point Information defining a location in space. For example, the points may be defined relative to a capturing space (for example, points on a digitizer), a virtual ink space (the coordinates in a space into which captured ink is placed), and/or display space (the points or pixels of a display device).

Document Any electronic file that has a viewable representation and content. A document may include a web page, a word processing document, a note page or pad, a spreadsheet, a visual presentation, a database record, image files, and combinations thereof.

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the illustrative operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media such as computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

In some aspects, a pen digitizer 165 and accompanying pen or stylus 166 are provided in order to digitally capture freehand input. Although a direct connection between the pen digitizer 165 and the user input interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. Further, the system may include wired and/or wireless capabilities. For example, network interface 170 may include Bluetooth, SWLan, and/or IEEE 802.11 class of combination abilities. It is appreciated that other wireless communication protocols may be used in conjunction with these protocols or in place of these protocols.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are illustrative and other means of establishing a communications link between the computers may be used.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
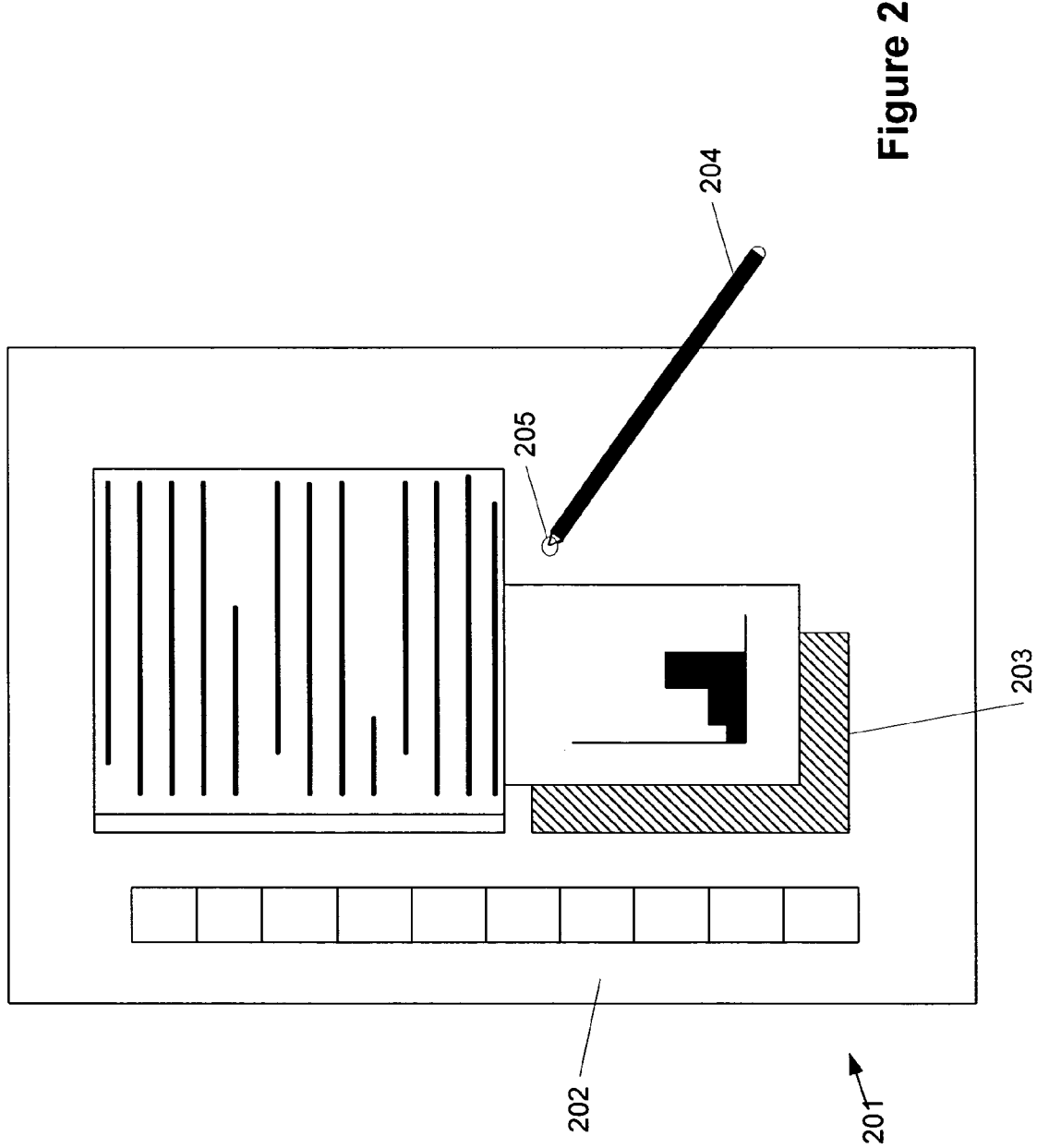
FIG. 2 shows an input to a stylus based computing system in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the.Net programming model from Microsoft Corporation.

Contact Erasing

Figure 3:
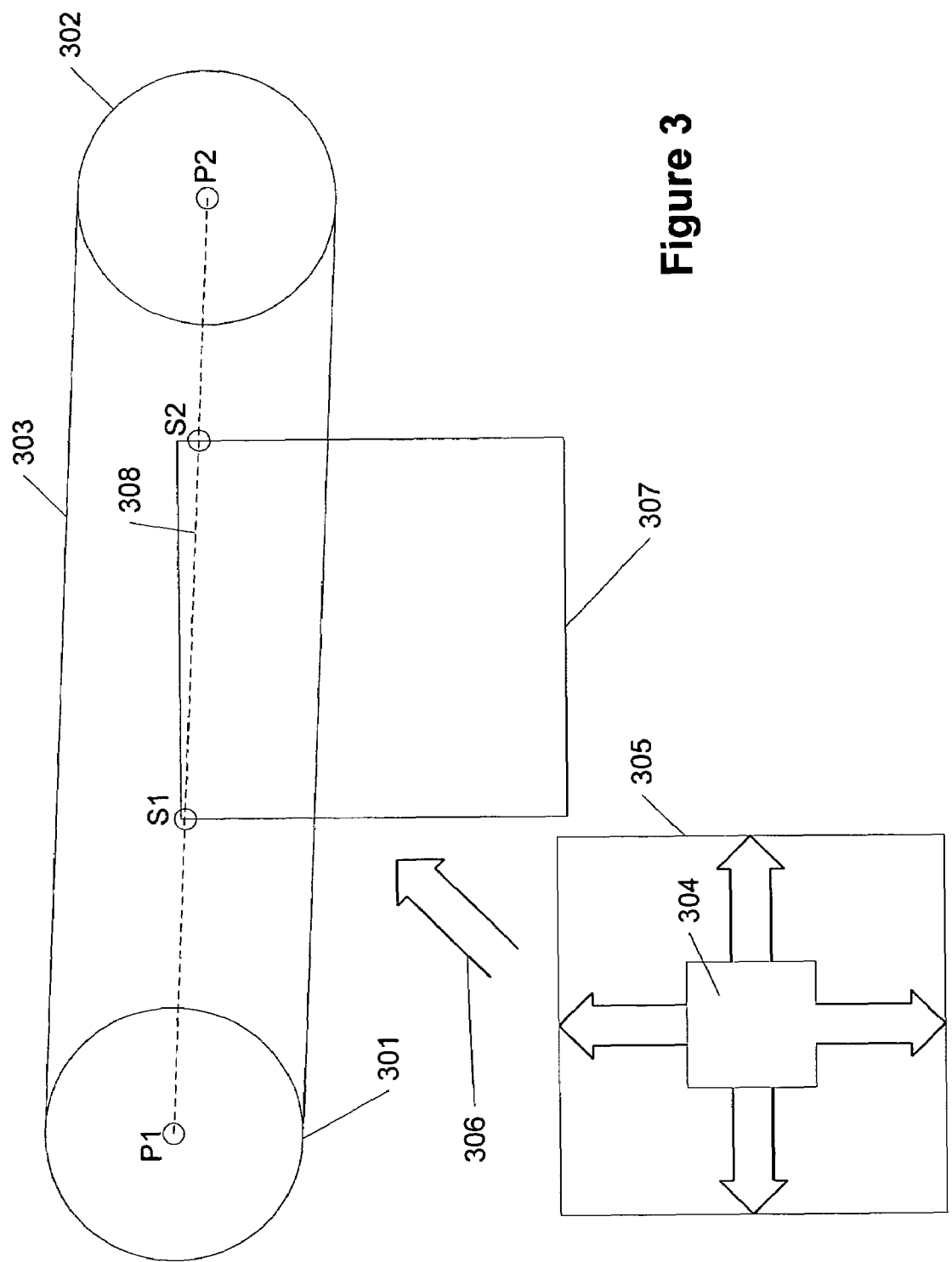
FIG. 3 shows a conventional erasing process for erasing ink strokes based on erasing contours contacting a midline of an ink stroke.

Aspects of the present invention relate to erasing portions of strokes of ink. Ink may be comprised of data points that are connected by line segments. When one wants to erase a line segment or a portion of an ink stroke, one generally employs an erasing tool to begin to obliterate the ink stroke. FIG. 3 shows an example of an erasing tool beginning to erase a portion of an ink stroke.

In FIG. 3, 2 data points P1 and P2 help make up ink stroke 303. Surrounding each point P1 and P2, is the shape of a tip of a stylus that was used to create the points, 301 and 302, respectively. In this example the shape of the stylus that was used to create ink strokes 303 was a circle, resulting in the circular representations 301 and 302 of the stylus.

In conventional approaches, an erasing tool 304 may be moved into ink 303 to start to separate the ink stroke into two or more ink strokes. Here, the erasing tool 304 is inflated to size 305. The size of the inflation is half the width or diameter of the ink tip used to make ink stroke 303. The inflated erasing tool shape 305 is moves to contact ink stroke 308 (represented by arrow 306). The points where the inflated erasing tip shape 305 intersects with the spine of ink stroke 308 are used as points S1 and S2. However, this approach generally only worked well with square erasing tips with circular ink tip shapes. Other combinations of shapes did not produce visually pleasing results.

Aspects of the present invention relate to making the separation of ink strokes using an erasing tool approximate that of actual ink being erased. In particular, aspects of the present invention allow an ink stroke to be erased closer in distance to where an eraser tool enters an ink stroke. In some aspects of the present invention, the erasing may begin at contact between the erasing tool and the ink stroke.

Erasing Input

Figure 4A:
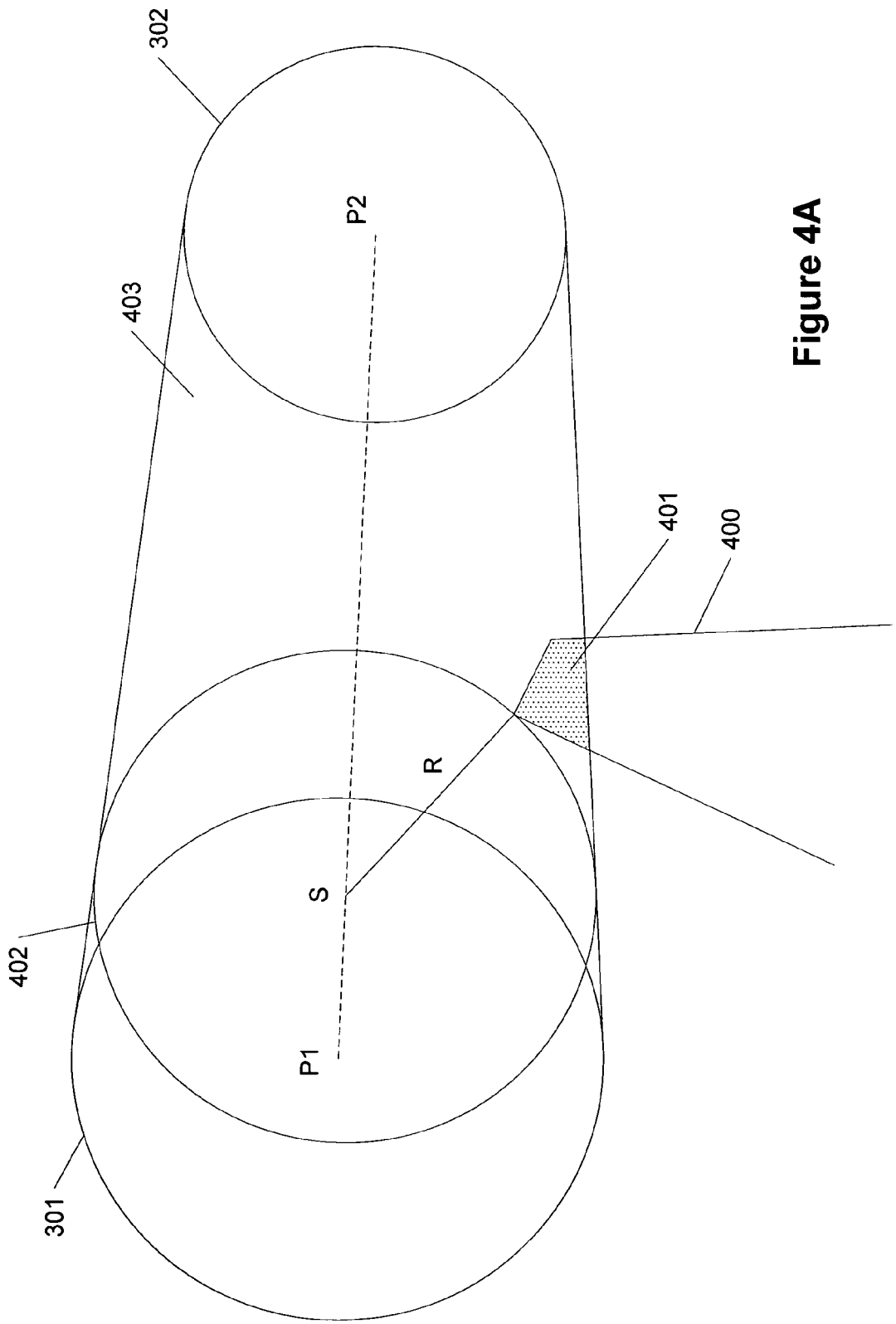
FIGS. 4A and 4B show erasing boundaries in accordance with aspects of the present invention.
Figure 4B:
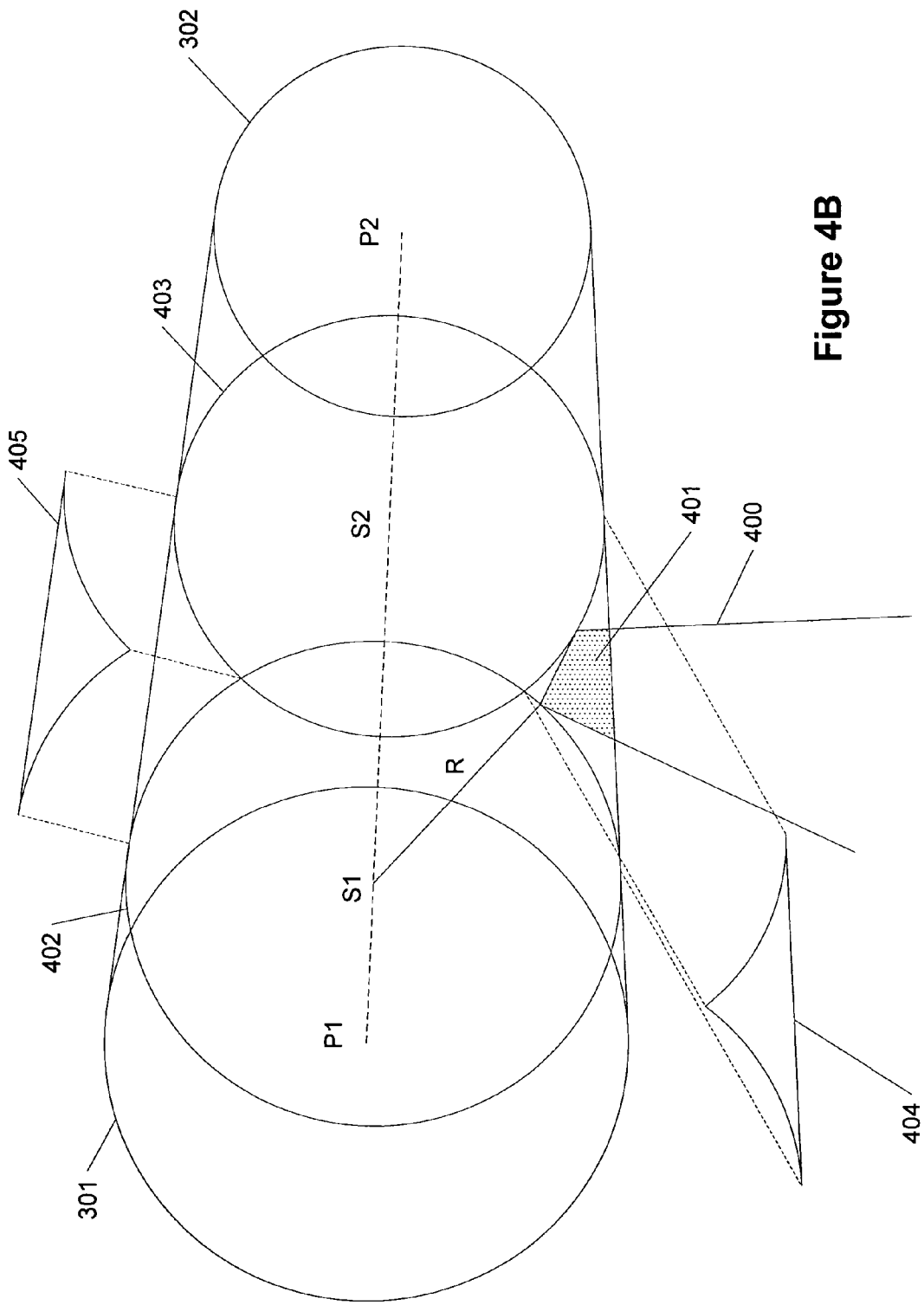

Input to a system to erase a portion of an ink stroke includes some type of erasing tool. The erasing tool may include any definite shape or a point. FIGS. 4A and 4B show examples of an erasing tool starting to erase portions of an ink stroke.

FIG. 4A shows an ink stroke segment 403 between node points $P_1,P_2$ with ink stroke to shapes 301 and 302 respectively. FIG. 4A also shows a segment of an erasing contour 400 intersecting the ink segment 403. The portion of the erasing contour 400 that is within ink segment 403 is shaded as portion 401. The ink stroke tip shape (shown here as circles 301 and 302) may include a circle or ellipse or convex polygon (which may or may not be the shape of a square, rectangle, and/or convex hull polygon), with variable or constant orientation, and constant or variable pressure. The erasing contour 400 is defined by a move of a displayed or physical eraser with round (or elliptical) or polygonal tip shape (which may or may not be the shape of a square, rectangle, and/or convex hull polygon). An elliptical eraser tip can be used as well, for instance, by approximating to a polygon. Additional eraser tip shapes may be used as well through approximation to a polygonal shape.

FIG. 4A also shows point S along the chord P1,P2, where the ink tip shape at point S contacts erasing contour 401. For the sake of explanation, the input ink tip shape is shown as a circle of radius R.

FIG. 4B shows an example similar to that of FIG. 4A in which two points S1 and S2 are found to contact erasing contour 401 with their ink tip shapes 402 and 403 respectively. Here, as points S1 and S2 are found, the various ink strokes may be read displayed so as to open region 404 to create the appearance that erasing contour 401 has erased that portion of the ink stroke. With an ink stroke being separated at a location of erasing contour 401 one may also allow region 405 to be shown as well as being eliminated as erasing contour 401 enters the ink stroke.

Aspects of the present invention attempt to find the points $S_1,S_2$ on the chord of the ink segment P1P2, such that if one splits or clips the ink stroke at them, there is no or minimal space between the erasing contour and the resulting ink.

The logic of finding $S_1$ between $P_1$ and the erasing contour is identical to finding $S_2$ between the erasing contour and $P_2$. Accordingly, the following presents variety of approaches for the generic case of finding a point S between the node point $P_1$ of an ink segment and an erasing contour cutting the segment.

Process for Erasing

The following describes a process for determining points S than allowing a system to render an ink stroke using point S as the end point of an ink stroke.

First, a line segment or arc must intersect with an ink stroke. This may be performed in a variety of ways including but not limited to hit testing the various points or end points of line segment or arc to determine whether they fall within an ink stroke.

Figure 5:
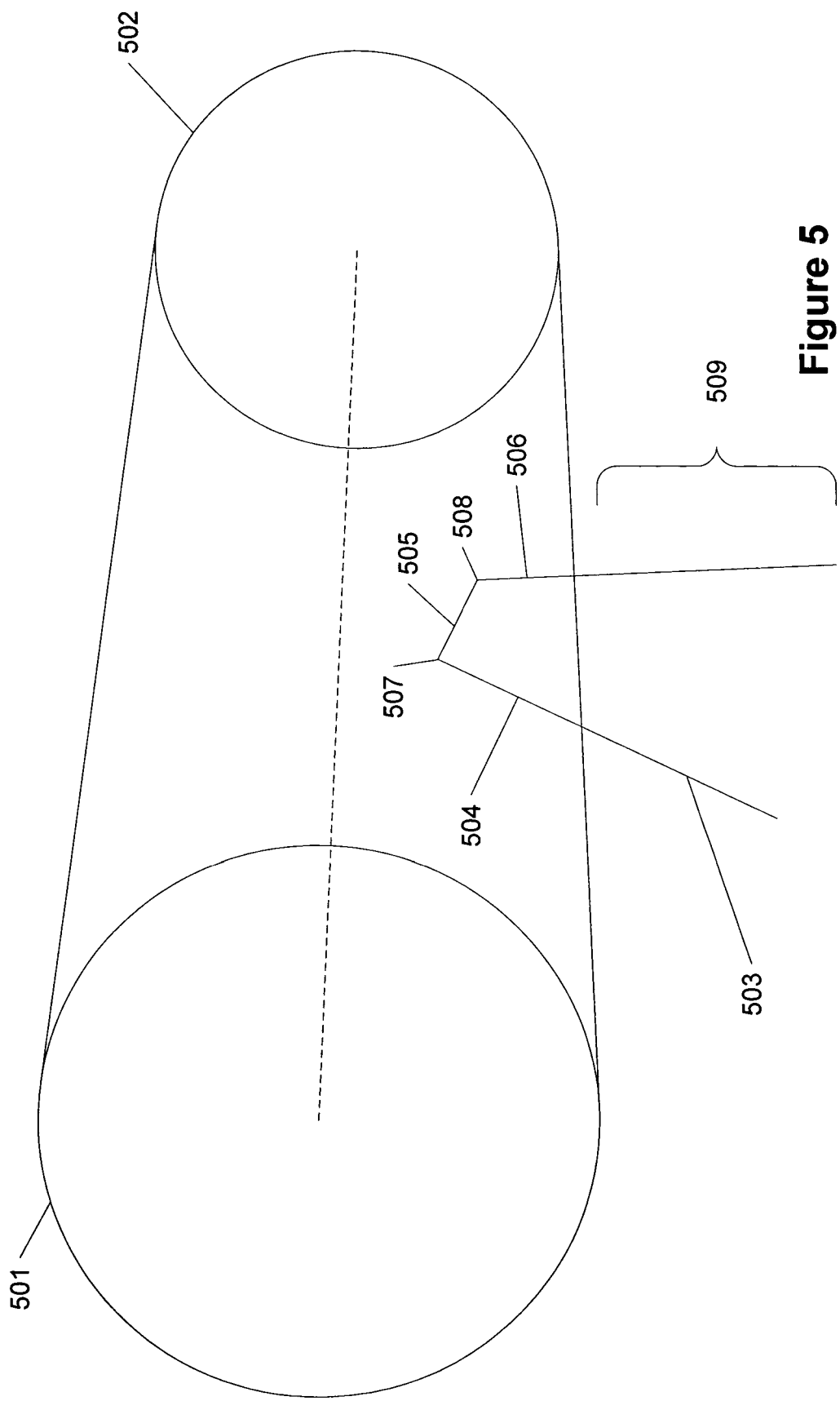
FIG. 5 shows an erasing contour in accordance with aspects of the present invention.

Next, the system select those segments of the erasing contour (referred to herein as "cutting segments"), which have the point $P_1$ on their outer side. (If the erasing contour is defined clockwise, the outer side is on the left of the contour segments. The logic of finding out if a point is on the left side off an arc or linear segment is well known in the art (for instance, it may be the determinant of a line segment and a point) and outside of scope of this disclosure). FIG. 5 shows into tip shapes 501 and 502 and cutting segment 503. Cutting segment 503 includes cutting segments within an ink stroke and cutting segments outside of the ink stroke. The cutting segments inside the ink stroke include linear segments 504, 505, and 506, and vertices 507 and 508. The portion of cutting segment 503 outside of the ink stroke is designated as erasing contour 509. Because erasing contour 509 is outside of the ink stroke it does not factor into where the ink stroke is being cut.

Next, for each qualified cutting segment, S is found and the one nearest to $P_1$ is a split point at which an ink stroke may be divided. If $P_1$ appears closer to the erasing contour than S, this means that this side of the ink segment is to be erased entirely.

The processes of finding S are specific to the combinations of the ink tip shape, which may be either a circle or a convex polygon, and the type of the cutting geometry—for instance, a linear segment or arc.

Ink Tip Shape: Circle

The following describes an ink tip shape being a circle.

By definition of ink contour geometry, dimensions of an ink tip shape are changing linearly between any two subsequent ink nodes. Of course, it is a simpler case if all ink tip shapes (or sizes) are constant. The more complex and general approach is shown here.

This means that for any point S located on the ink segment $P_1,P_2$ one may use the following:

$$S=P1+s*(P2-P1) \qquad \text{Eq. 1}$$

$$R=R1+s*(R2-R1) \qquad \text{Eq. 2}$$

$$0<=s<=1 \qquad \text{Eq. 3}$$

where R1, R2 and R are the radii of the round ink tip at the points P1, P2 and S respectively.

Cutting with a Linear Segment

Figure 6:
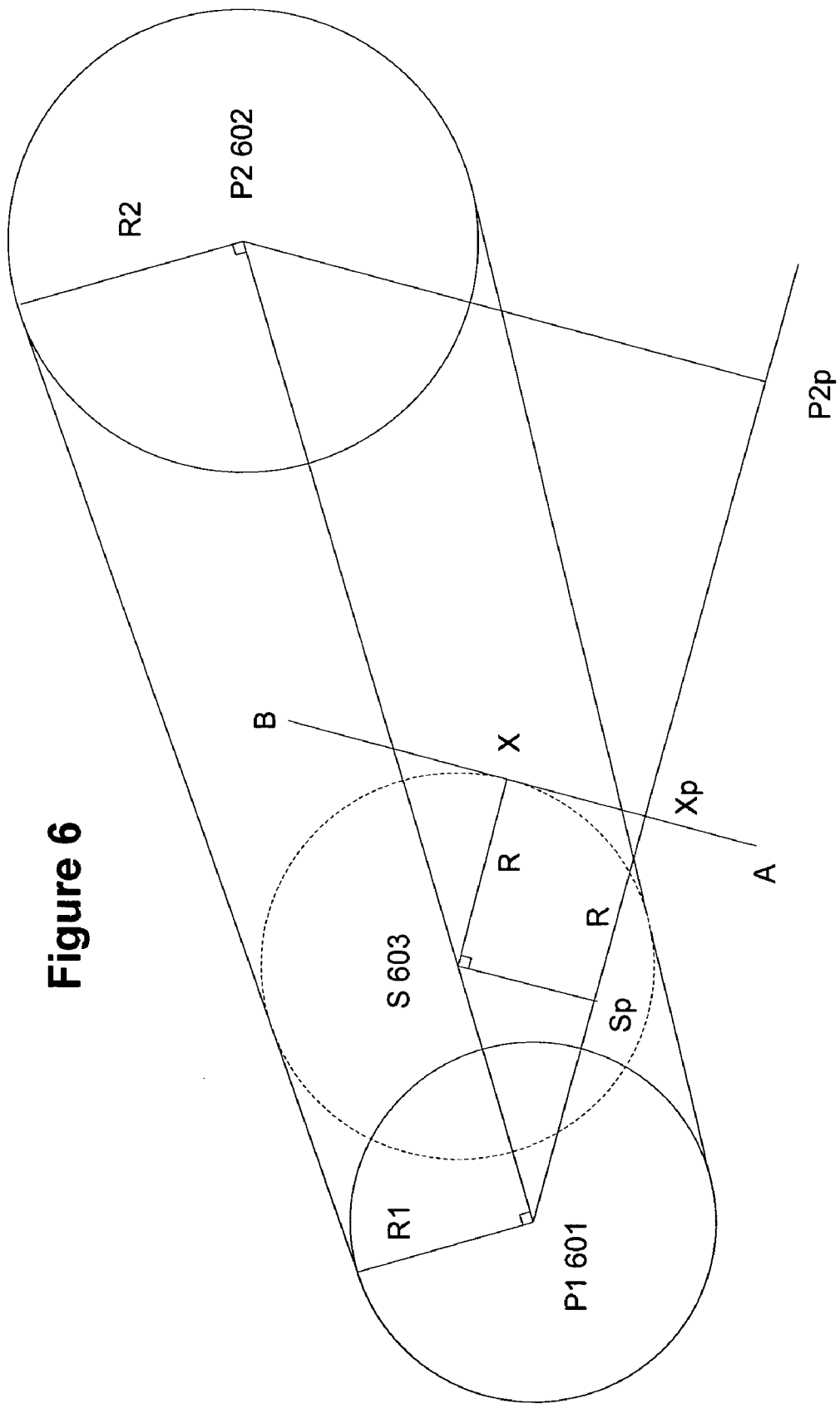
FIG. 6 shows determination of a new endpoint of a stroke based on a cutting line segment in accordance with aspects of the present invention.

The following describes cutting ink with circular ink tip shapes with a linear segment. FIG. 6 shows an input erasing contour line segment AB intersecting the ink segment created by points P1 601 and P2 602.

Point P1 is defined as having an ink tip shape radius of R1. Point P2 is defined as having an ink tip shape radius of R2. Point S 603 is defined as having an ink tip shape radius R. The contact point between line segment AB and the ink shape at point S 603 with radius R is represented as point X.

Here, the locations of points P1, P2 and erasing contour one segment AB are known. The locations of point S 603 and point X are not known.

At the outset, one does not know where on the line AB the intersection point X is (if at all), but one can tell that, if a normal is drawn from $P_1$ to the line AB, the point Xp is the projection of X onto $P_1Xp$.

The segment SX is perpendicular to AB and therefore parallel to $P_1Xp$. This means that point Sp (the projection of S onto $P_1Xp$) is at the distance R from Xp to $P_1$.

One can also find point $P_2p$ (the projection of $P_2$ on $P_1Xp$). With this information, one can find s:

$$s = x - (R/\text{LengthOf}(P1P2p)), \quad \text{Eq. 4}$$

where $$x = \text{LengthOf}(P1Xp)/\text{LengthOf}(P1P2p) \quad \text{Eq. 5}$$

and $$R = R1 + s*(R2 - R1) \quad \text{Eq. 6}$$

which provides $$s = (\text{LengthOf}(P1Xp) - R1)/(\text{LengthOf}(P1P2p) + R2 - R1). \quad \text{Eq. 7}$$

Having s, one can find S for the cutting line AB:

$$S = P1 + s*\text{LengthOf}(P2 - P1) \quad \text{Eq. 8}$$

and X as the projection of S onto AB.

It is noted that the above S is relevant for X located on the actual cutting segment AB. If X is on the cutting segment AB, then S is the split point where to cut segment P1P2. However, X may not be on cutting segment AB. In that situation, then the end point of the segment AB nearest to the X is the intersection point for the cutting segment AB and the ink stylus shape for the actual split point S still needs to be found. Here, finding S based on a point (starting with equation 10 set forth below) may be used.

Cutting with an Arc

Figure 7:
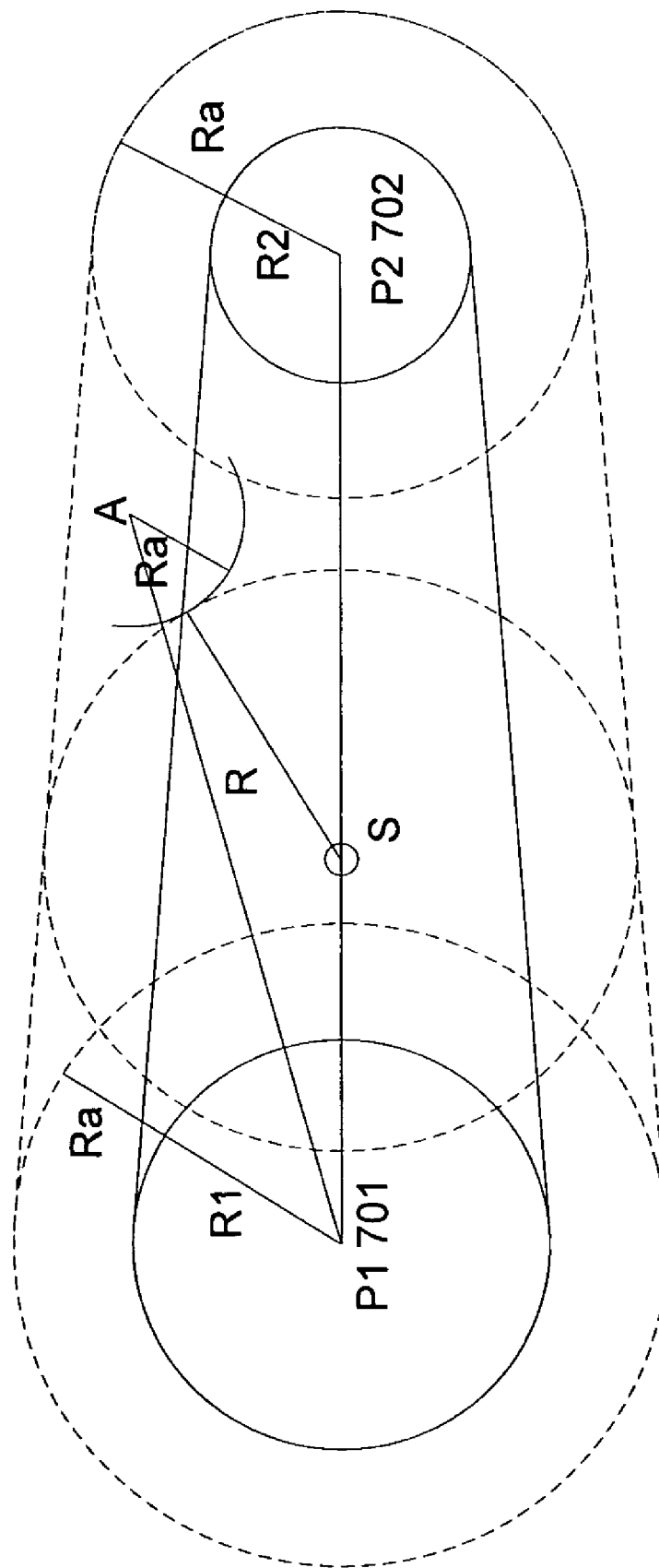
FIG. 7 shows determination of a new endpoint of a stroke based on a cutting arc in accordance with aspects of the present invention.
Figure 8:
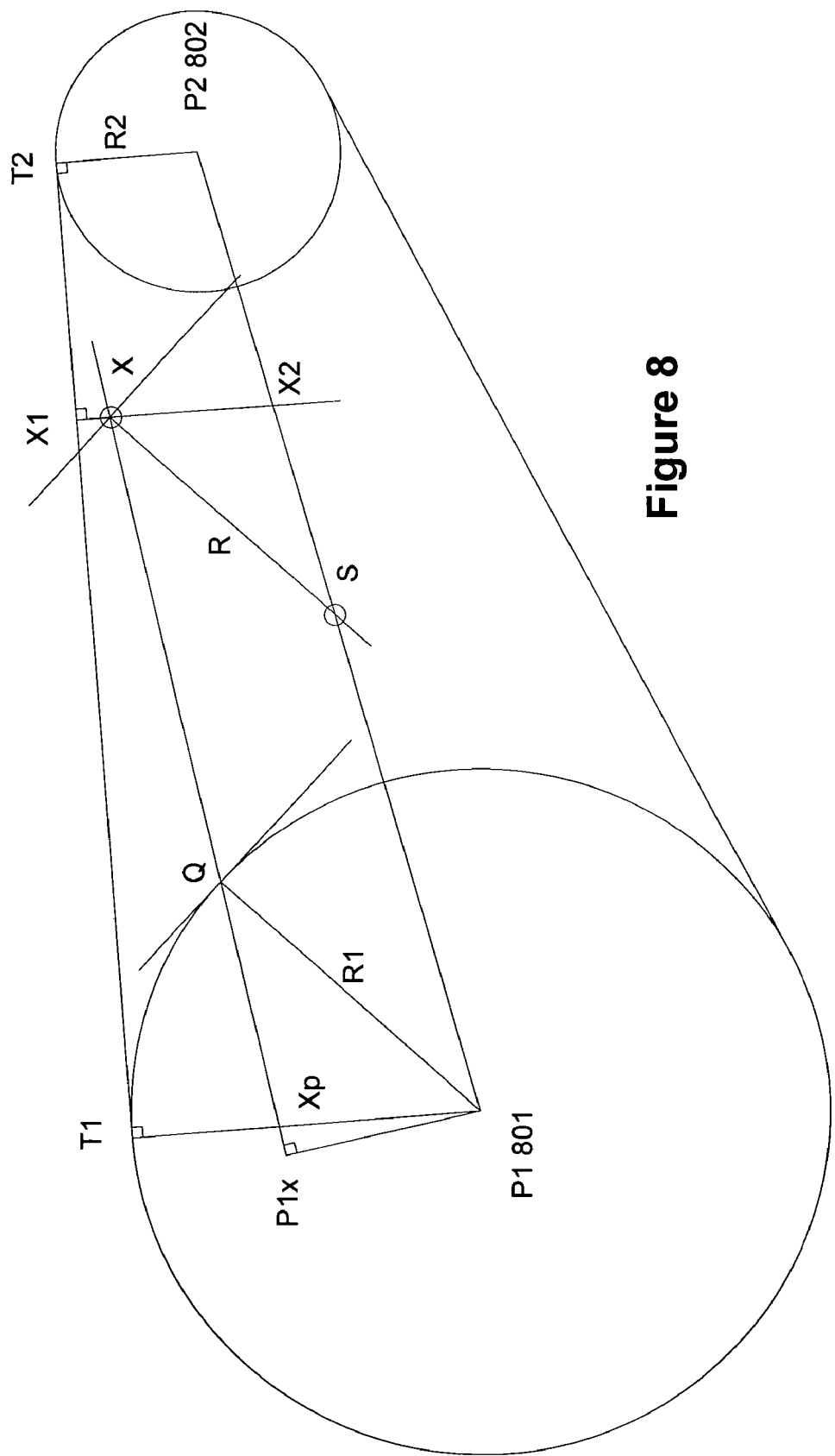
FIG. 8 shows determination of a new endpoint of a stroke based on a cutting point in accordance with aspects of the present invention.
Figure 9:
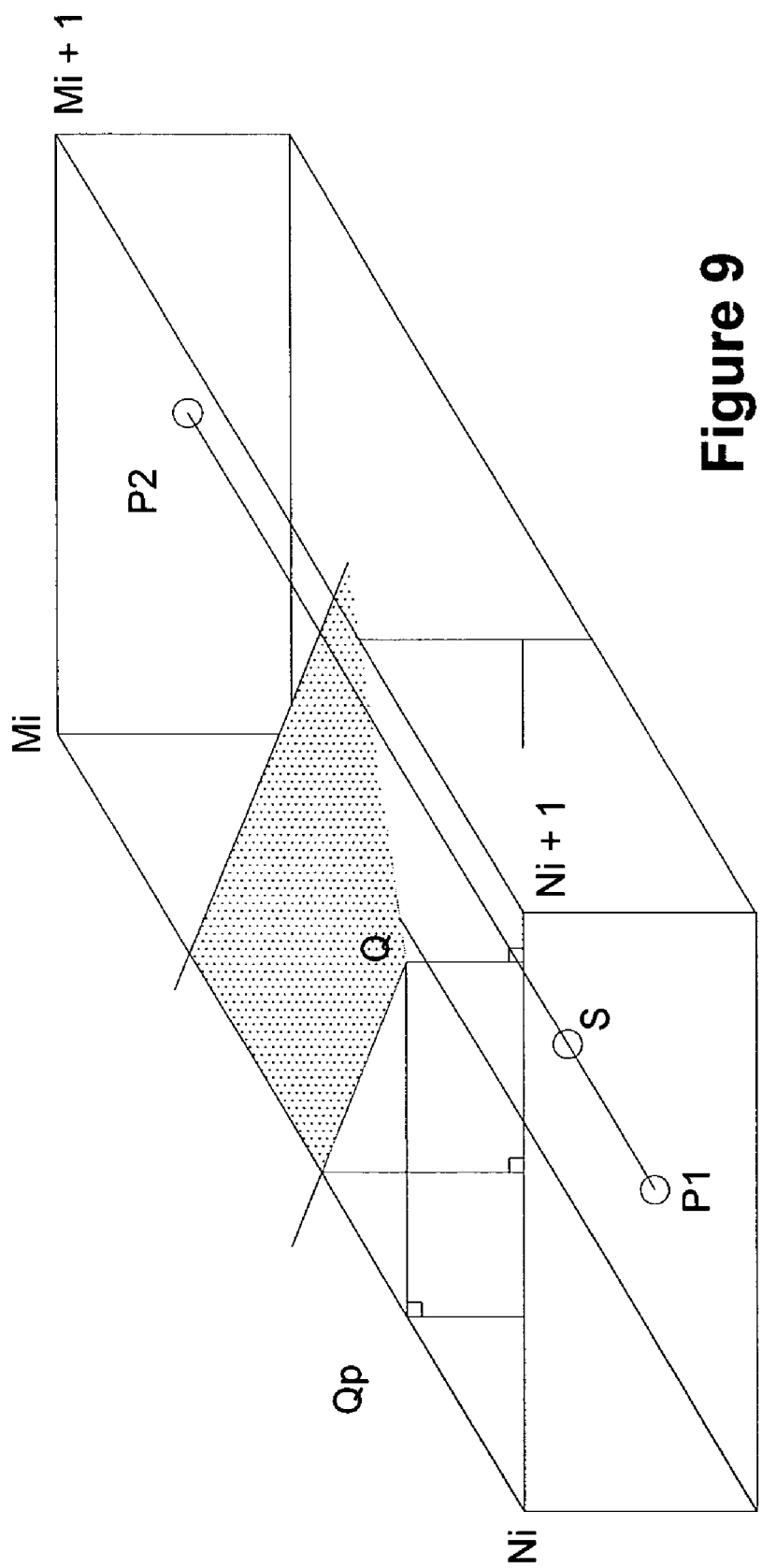
FIG. 9 shows determination of a new endpoint of a stroke based on a cutting polygon in accordance with aspects of the present invention.

Sometimes, the input erasing contour may be an arc. FIG. 7 shows an example where the erasing contour is an arc with center A and radius Ra. Here, the segment $AP_1$ crosses the arc and Ra is less then the distance from A to $P_1$.

R is the shortest distance from S to the cutting segment. If the cutting segment is an arc with the center A and radius Ra, then (R+Ra) is the shortest distance from S to A, and for the same s $$(R + Ra) = (R1 + Ra) + s*((R2 + Ra) - (R1 + Ra)) \quad \text{Eq. 9}$$

Next, one can find S using the process for determining S based on a point (starting with equation 10 set forth below) with A as the cutting point and $(R_1+Ra)$, $(R_2+Ra)$ and $(R+Ra)$ as the radii of $P_1$, $P_2$ and S respectively. In other words, cutting with an arc may be viewed as cutting with point where the lengths of the radii have been increased by the distance of the radius of the arc Ra.

Cutting at a Point

The following describes how to determine S from a cutting point X. Here, X is inside the contour of the line segment.

If X is on the line $P_1P_2$, then $$s = (\text{LengthOf}(P1X) - R1)/(\text{LengthOf}(P1P2) + R2 - R1). \quad \text{Eq. 10}$$

Otherwise, X is not on line P1P2 and perform the following:

a. Compute X1 as the projection of X onto T1T2, the nearest to X segment connecting the node contours (the connecting segments are the common tangent of the nodes P1, P2 at their respective ink shape tips).

b. Find X2—the point of intersection of the lines P1P2 and X1X.

c. Compute $$x = \text{LengthOf}(XX2)/\text{LengthOf}(X1X2). \quad \text{Eq. 11}$$

d. On the segment P1T1, find $$Xp = P1 + x*\text{LengthOf}(T1 - P1) \quad \text{Eq. 12}$$

e. Find Q—the point of intersection of XpX and the circle with the center at P1 and the radius R1.
  1. Find P1x—the projection of P1 on XpX.
  2. Find the distance from P1x to Q:

$$d = \text{Sqrt}(R1*R1 - \text{SquaredLengthOf}(P1x, P1)) \quad \text{Eq. 13}$$

3. $Q = P1x + (d/\text{LengthOf}(P1x, X))*(X - P1x)$ f. Compute the vector QP1 g. S is the point of the intersection of the line P1P2 and the vector QP1 applied at X.

Ink Tip Shape: Segment with Polygonal Tip

The above approaches relate to when the ink tip shape is a circle. Alternatively, one may use a polygonal tip to determine a point S.

When ink tip shape is a convex polygon, one may iterate in a constant direction (for instance, clockwise) through the edges of the polygon P1 and hit test the cutting segment against quadrangles $N_IM_IM_{I+1}N_{I+1}$ with $M_1$ on the left side off the vector $N_IN_{I+1}$. If the cutting segment intersects the quadrangle, on the intersected part of the segment, one may then find point Q (the nearest to the line $N_IN_{I+1}$) and point $Q_P$ (the point of the intersection of the segment $N_IM_I$ and vector $N_{I+1}N_I$ started at Q). Next, $$QP = NI + s*\text{LengthOf}(MI - NI) \quad \text{Eq. 14}$$

$$s = \text{LengthOf}(QP - NI)/\text{LengthOf}(MI - NI). \quad \text{Eq. 15}$$

If the cutting segment intersects more than one quadrant, one may then use the smallest s to find the split point:

$$S = P1 + s*\text{LengthOf}(P2 - P1) \quad \text{Eq. 16}$$

Using this approach, one may also approximate other shapes including is that sees diamond points, and odd-shaped figures so as to provide a user with additional erasing tips or contours.

Aspects of the present invention have been described in terms of preferred and illustrative embodiments thereof. Numerous other embodiments, modifications and variations within the scope and spirit of the appended claims will occur to persons of ordinary skill in the art from a review of this disclosure.

We claim:

1. A process of rendering, on a display coupled to a computing device, an electronic ink stroke being intersected by an erasing contour, the process comprising the steps of:

determining a shape of an ink input stylus tip of the electronic ink stroke comprising a sequence of points forming a midline within the electronic ink stroke and being captured by the computing device, wherein the shape of the ink stylus tip:

is maintained by each of the sequence of points on the midline of the electronic ink stroke; and has a dimension of more than one minimum resolution unit in height and width on the display;

determining a shape of an erasing contour;

determining, as the erasing contour contacts the electronic ink stroke, an area that is within the electronic ink stroke and to be erased by the erasing contour, the determining comprising:

identifying a new end point on the midline of the electronic ink stroke based on said erasing contour's location within said electronic ink stroke and based on said shape of said ink input stylus tip; and calculating the area to be erased based on a portion of the erasing contour within the electronic ink stroke and the new identified end point, wherein the calculated area comprises:

a first area covered by the portion of the erasing contour within the electronic ink stroke; and a second area surrounding but not covered by the first area; and rendering the determined area on the display.

2. The process according to claim 1, wherein said erasing contour has not crossed the midline of said electronic ink stroke.

3. The process according to claim 1, further comprising the step of: determining another new end point based on said erasing contour's location within said electronic ink stroke on an opposite side of said erasing contour from said new end point.

4. The process according to claim 1, wherein said erasing contour is a line segment.

5. The process according to claim 1, wherein said erasing contour is an arc.

6. The process according to claim 1, wherein said erasing contour is a point.

7. The process according to claim 1, wherein said shape of said ink input stylus tip is a circle.

8. The process according to claim 1, wherein said shape of said ink input stylus tip is a polygon.

9. A computer-readable medium having stored thereon a program facilitating rendering, on a display, an electronic ink stroke being intersected by an erasing contour, said program comprising the steps of:

determining a shape of an ink input stylus tip of the electronic ink stroke comprising a sequence of points forming a midline within the electronic ink stroke and being captured by the computing device, wherein the shape of the ink stylus tip:

is maintained by each of the sequence of points on the midline of the electronic ink stroke; and has a dimension of more than one minimum resolution unit in height and width on the display;

determining a shape of an erasing contour;

determining, as the erasing contour contacts the electronic ink stroke before intersecting with the midline of the electronic ink stroke, an area that is within the electronic ink stroke and to be erased by the erasing contour, the determining comprising:

identifying a new end point on the midline of the electronic ink stoke based on said erasing contour's location within the electronic ink stroke and based on said shape of said ink input stylus tip; and calculating the area to be erased based on a portion of the erasing contour within the electronic ink stroke and tile identified new end point, wherein the area comprises:

a first area covered by the portion of the erasing contour within the electronic ink stroke; and a second area surrounding but not covered by the first area; and rendering the determined area on the display.

10. The computer-readable medium according to claim 9, wherein said erasing contour has not crossed the midline of said electronic ink stroke.

11. The computer-readable medium according to claim 9, said program further comprising the step of:

determining another new end point based on said erasing contour's location within said electronic ink stroke on an opposite side of said erasing contour from said new end point.

12. The computer-readable medium according to claim 9, wherein said erasing contour is a line segment.

13. The computer-readable medium according to claim 9, wherein said erasing contour is an arc.

14. The computer-readable medium according to claim 9, wherein said erasing contour is a point.

15. The computer-readable medium according to claim 9, wherein said shape of said ink input stylus tip is a circle.

16. The computer-readable medium according to claim 9, wherein said shape of said ink input stylus tip is a polygon.

17. The process according to claim 1, wherein said shape of said ink input stylus tip is a circle, and wherein said ink input stylus tip is used to create an ink segment defined by endpoints P1 and P2, said endpoints P1 and P2 located on the midline of the ink segment and rendered by said input stylus tip as a first circle of radius R1 and a second circle of radius R2, respectively, and wherein a point S that serves as a center of a third circle of radius R that touches said erasing contour and is located on the midline of the ink segment between the endpoints P1 and P2, and wherein following characteristic equations describe location of the point S and size of the third circle defined by radius R:

$S = P1 + s*(P2-P1)$, and $R = R1 + s*(R2-R1)$, wherein $0 \leq s \leq 1$.

18. The computer readable medium according to claim 9, wherein said shape of said ink input stylus tip is a circle, and wherein said ink input stylus tip is used to create an ink segment defined by endpoints P1 and P2, said endpoints P1 and P2 located on the midline of the ink segment and rendered by said input stylus tip as a first circle of radius R1 and a second circle of radius R2, respectively, and wherein a point S that serves as a center of a third circle of radius R that touches said erasing contour and is located on the midline of the ink segment between the endpoints P1 and P2, and wherein following characteristic equations describe location of the point S and size of the third circle defined by radius R:

$S = P1 + s*(P2-P1)$, and $R = R1 + s*(R2-R1)$, wherein $0 \leq s \leq 1$.

19. The process according to claim 1, wherein:

dimensions of shape of the ink input stylus tip of a first and second end point of the electronic ink stroke vary; and dimensions of shape of each of the sequence of points between the first and second end point vary in proportion with the dimensions of shape of the first and second end point.

20. The computer readable medium according to claim 9, wherein:

dimensions of shape of the ink input stylus tip of a first and second end point of the electronic ink stroke vary; and dimensions of shape of each of the sequence of points between the first and second end point vary in proportion with the dimensions of shape of the first and second end point.

* * * * *